Aug. 4, 1925.
W. B. PROUTY
AIR FILTER
Filed May 2, 1921
1,548,484
4 Sheets-Sheet 1
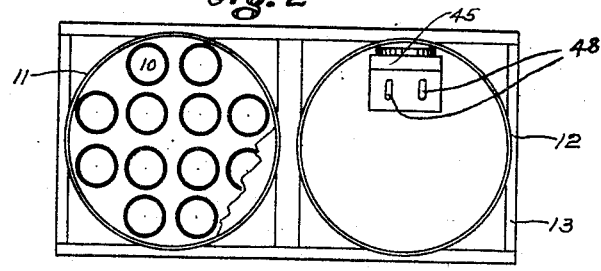
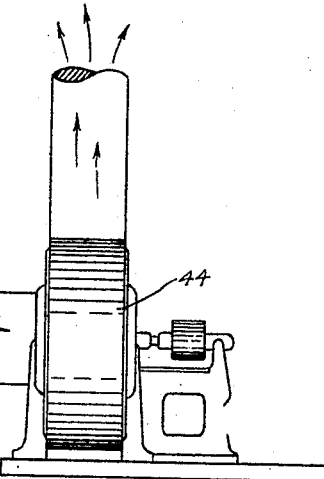
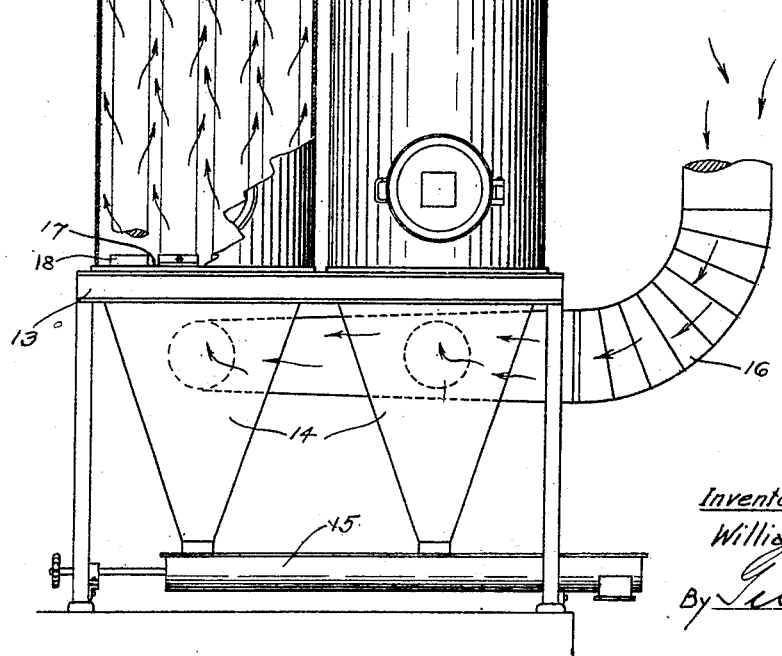
Inventor
William B. Prouty
By Gillson & Gillson
Attorneys

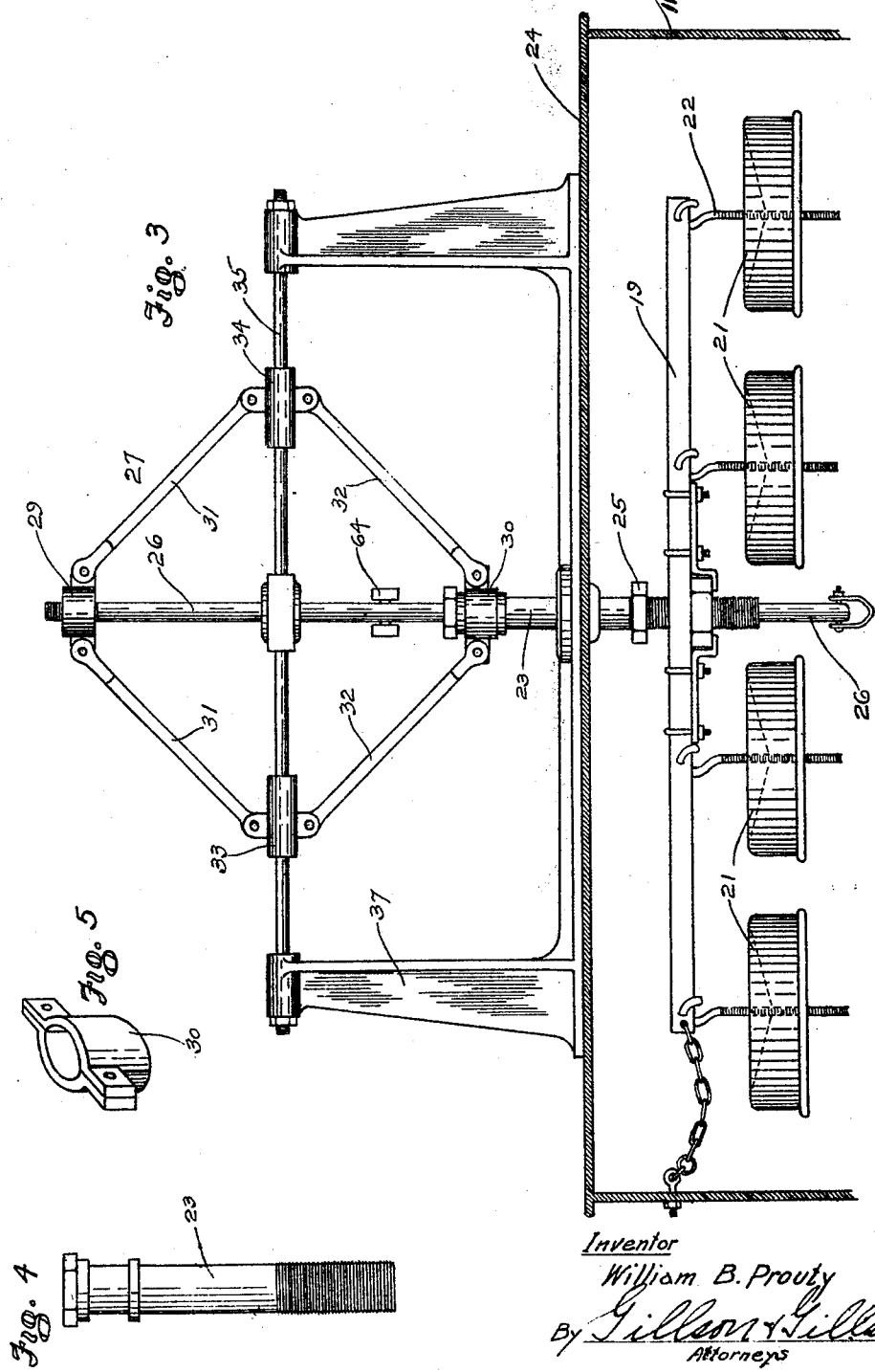

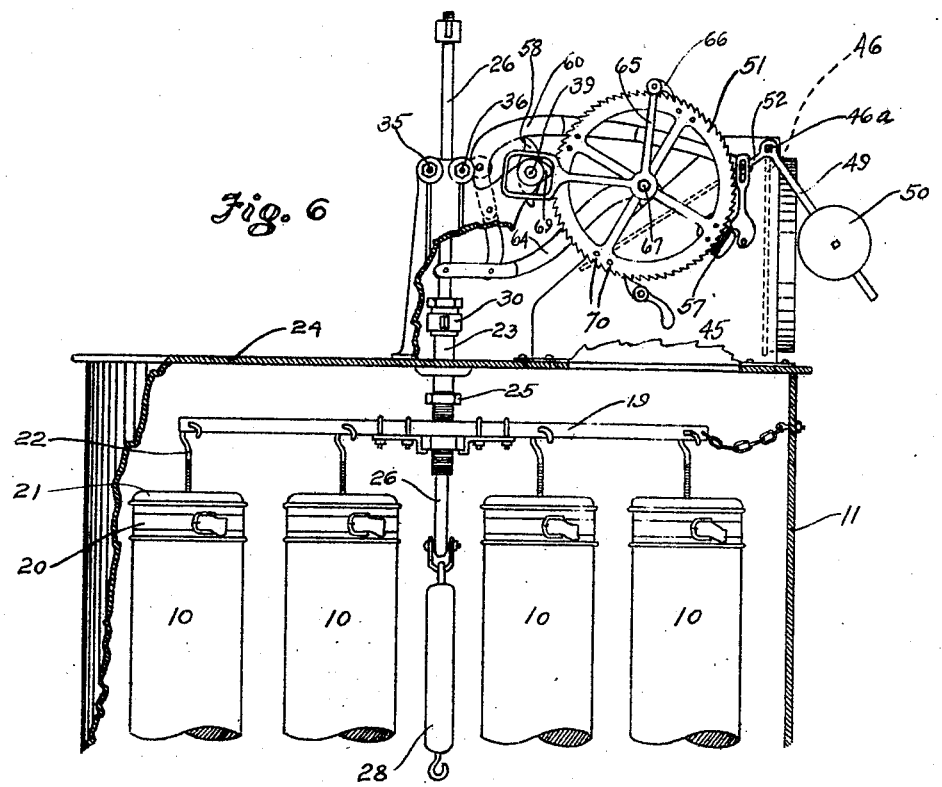
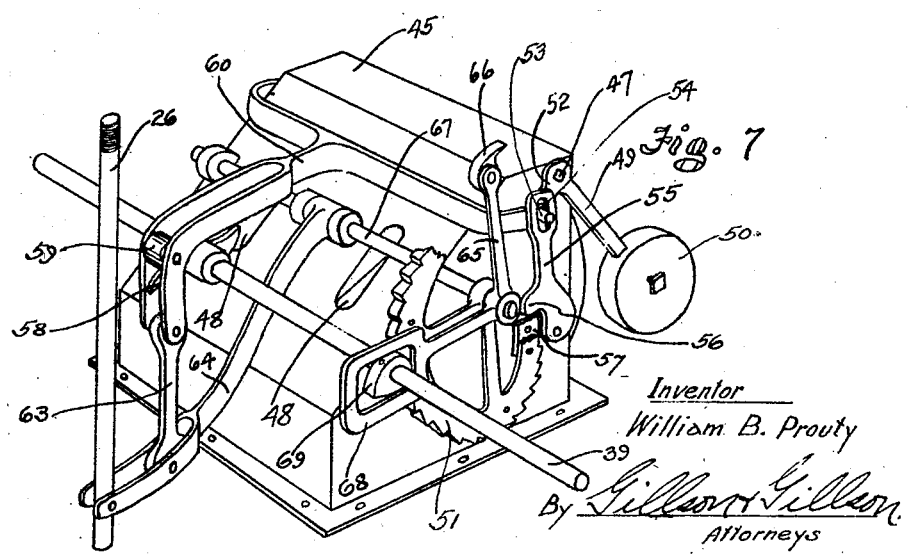

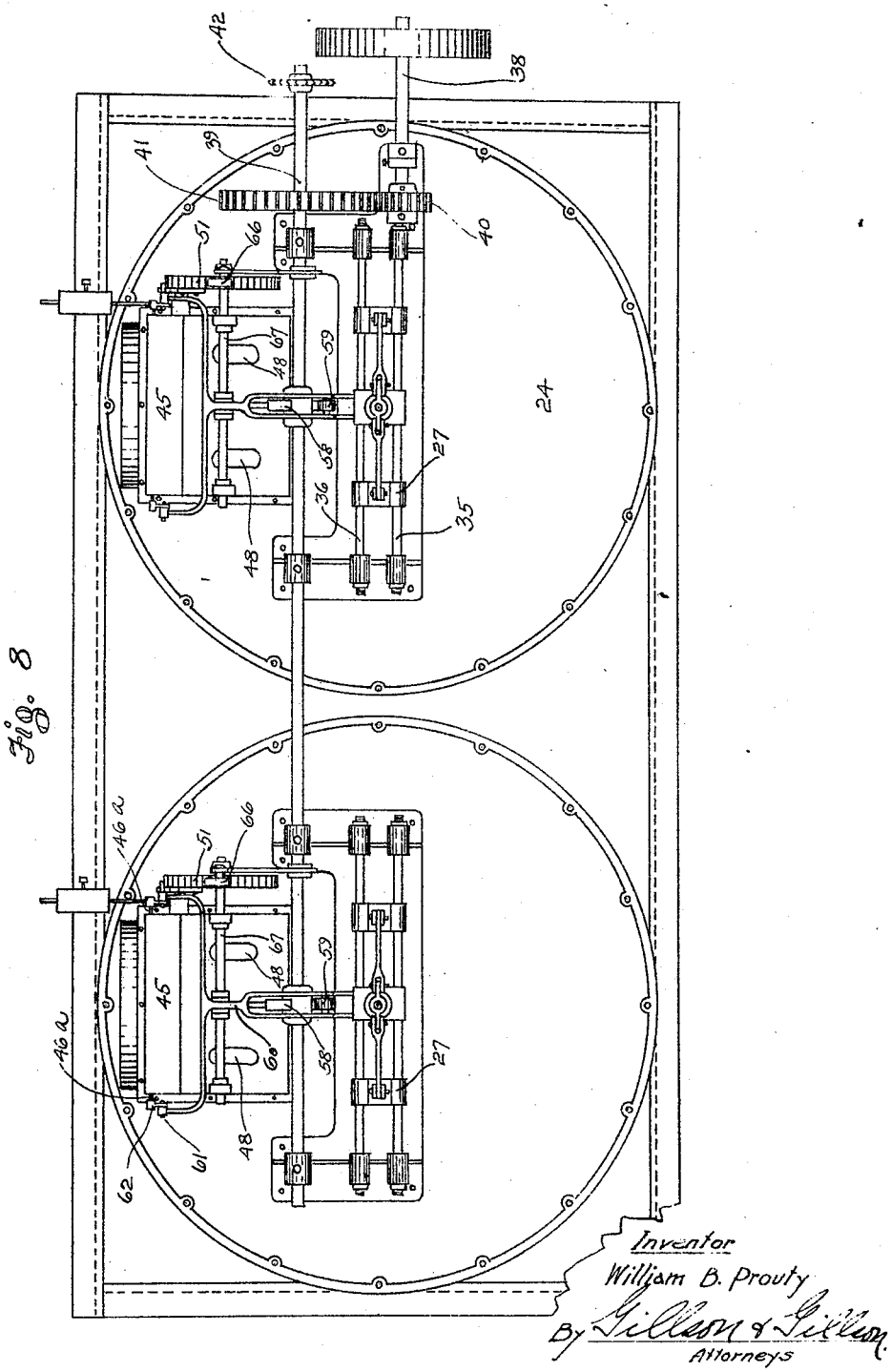

Patented Aug. 4, 1925.

1,548,484

UNITED STATES PATENT OFFICE.

WILLIAM B. PROUTY, OF CHICAGO, ILLINOIS.

AIR FILTER.

Application filed May 2, 1921. Serial No. 466,194.

*To all whom it may concern:*

Be it known that I, WILLIAM B. PROUTY, a citizen of the United States, and resident of Chicago, county of Cook, and State of Illinois, have invented certain new and useful Improvements in Air Filters, of which the following is a specification, and which are illustrated in the accompanying drawings, forming a part thereof.

The invention relates to air filtering machines and particularly to those using tubular cloth filters, or so-called bags for arresting and collecting finely divided dry materials such as pulverized coal or food products, chemicals and metallic oxides in powdered form when the same are being conveyed by a current of air or furnace gases. Since these finely divided dry materials represent the finished product of many industries, and their value is frequently much enhanced if they are removed from the point of final preparation by flotation with air or gas, an efficient air filtering machine is an essential part of the equipment in these industries. Furthermore, the efficiency of these air filtering machines is largely dependent upon the provision of means for thoroughly cleaning the filtering bags at regular intervals without noticable interference with the continued operation of the machine as a whole.

The object of the invention is accordingly to provide an air filter of improved construction having special reference to the mechanism employed for cleaning the filtering bags. In its preferred form the invention accordingly contemplates apparatus comprising a plurality of sets of filtering bags and automatic means for shaking the filtering bags over each set in an improved and efficient manner at regular intervals.

In the accompanyig drawings—

Fig. 1 is a front elevation of one form of filtering machine embodying the features of improvement provided by the invention, with some parts being broken away to show the interior construction, and other parts permitted to promote simplicity of illustration;

Fig. 2 is a top plan view partly in section, the operative parts of the shaking mechanism being omitted;

Fig. 3 is a detail side elevation showing the operative parts of the mechanism for shaking the filtering bags of one set, the bags being omitted and the housing therefor being shown in section;

Fig. 4 is a side elevation and

Fig. 5 is a perspective view showing elements of the shaking mechanism separated from the other parts;

Fig. 6 is a detail transverse sectional view of the housing for one set of filtering bags, the associated shaking mechanism being shown in elevation;

Fig. 7 is a perspective view showing a valve head which is provided at the top of the housing for each set of filtering bags and the associated parts of the corresponding shaking and valve operating mechanism, and Fig. 8 is a top plan view of the apparatus illustrated in Fig. 1.

A complete apparatus embodying the features of improvement provided by the invention will usually include a plurality of sets of filtering bags, as 10, and an equal number of casings, as 11, 12, within which the said sets of filtering bags are separately contained. The apparatus illustrated in the drawings includes two of the said casings 11, 12, each being in the form of an upright drum or cylinder. As shown, the two casings 11, 12, rest upon a common elevated platform 13, and a pair of collecting hoppers 14, each connected with the lower end of one of the casings 11, 12, are located under the platform 13. Both of the hoppers 14 deliver to a common conveyor 15 through which the collected material is discharged and a common supply conduit 16 connects with both of the hoppers 14 at one side of the same (Fig. 1).

In carrying out the invention the filtering bags 10 are each fixedly held at their lower ends. For this purpose the floor 17 of each cylinder is provided with a plurality of openings about each of which is formed an upstanding flange 18 and the lower end of each filtering bag is clamped about one of the said flanges. The lower ends of the filtering bags 10 accordingly have open communication with the corresponding hopper 14 for the entry of the dust laden air delivered by the conduit 16 to the interior of the filtering bags and for the discharge of the collected material downwardly out of the filtering bags into the hopper. On the other hand, the chamber of each casing, as 11, about the bags 10 communicates with the chamber of the corresponding hopper 14 only through the walls of the bags.

At their upper ends the filtering bags 10 are suspended from a yoke 19. This yoke is normally drawn upwardly for the purpose of tensioning the bags, but is vibrated periodically for shaking the bags. As shown, the upper end of each bag is secured by a strap 20 to a flanged disk or cover 21 and each of the said disks 21 is removably and adjustably attached to the yoke 19 by a screw hook 22, which has threaded connection with the corresponding disk. It follows that the tension of each bag 10 may be separately adjusted by adjustment of the corresponding screw hook 22 while all of the bags of each set are tensioned together by raising the yoke 19. In shaking the bags, the yoke 19 is repeatedly released and thereby permitted to fall through a limited distance and is drawn upwardly with a jerk, preferably by a weight, after each release.

In the construction illustrated, the mechanism for lifting the yoke 19 comprises a tubular bolt 23 which has adjustable threaded connection with the yoke 19 and projects upwardly therefrom through the cover 24 of the corresponding casing, as 11. During the shaking of the bags this bolt has vertical sliding movement in the cover 24 of the casing, the upward movement of the bolt being limited by a stop nut 25 which is applied to the bolt over the yoke 19. Likewise, the stop nut 25 limits the threaded adjustment of the bolt 23 in the yoke 19. Engagement of the stop nut 25 with the underside of the cover 24, when the tubular bolt 23 is lifted, accordingly serves to indicate that the bags 10 have stretched in service to such an extent that the bolt 23 should be readjusted in the yoke 19, while engagement of the stop nut 25 with the yoke 19 indicates that the stretching of the bags has extended to a point where the screw bolts 22 should be readjusted in the covers 21.

The lifting of the tubular bolt 23 may be accomplished by a weighted plunger rod 26 which preferably slides through the bolt and is operatively connected therewith by a toggle frame generally designated 27, (Fig. 3). This arrangement has the advantage that the weights, as 28, attached to the lower end of the plunger 26 are contained within the casing, as 11. As shown, the toggle frame 27 comprises upper and lower swing nuts 29 and 30, two sets of toggle links 31, 32, and a pair of horizontally movable bearing blocks 33 and 34, one of the latter uniting the toggle links 31, 32, of each set. When so constructed, the upper wing nut 29 of the toggle frame 27 is applied to the upper end of the plunger rod 26 and the lower swing nut 30 is swiveled upon the tubular bolt 23. Furthermore, the bearing blocks 33, 34, move upon a horizontal slideway comprising a pair of stationary rods 35, 36, between which the plunger rod 26 is located.

It follows that weights, as 28, applied to the plunger rod 26, act upon the toggle links 31 of each set to press the bearing blocks 33, 34, outwardly upon the rods 35, 36, in opposite directions. The toggle links 32 of each set accordingly draw upwardly upon the bolt 23 thereby straining the filtering bags, as 10. Similarly, when the plunger rod 26 is lifted the bearing blocks 33, 34, are moved inwardly thereby depressing the bolt 23 and permitting the filtering bags to sag. Since the rods 35, 36, provide a stationary support upon which the bearing blocks 33, 34, slide, these rods may be held in place in any convenient manner. As shown, they are mounted in a bracket frame 37 which stands upon the cover plate 24 of the corresponding casing, as 11. This bracket frame preferably also provides bearings for a power shaft 38 and a counter shaft 39. As the purpose of the counter shaft is to vibrate the yoke 19 for shaking the bags 10 at relatively long intervals, the counter shaft is connected with the power shaft by gears 40 and 41, designed to rotate the counter shaft at slow speed. The counter shaft 39 preferably extends over all of the filter bag casings, as 11, 12, of the complete machine and a sprocket wheel, as 42, may be applied to one end of the counter shaft for the purpose of transmitting power to the conveyor 15.

The filtered air is discharged from the chambers of the casings, as 11, 12, to a common conduit 43 conventionally represented as leading to an exhaust fan 44. For this purpose a valve box 45 is provided at the top of each casing and these valve boxes connect with the conduit 43 at one side. Since communication between the chamber of each casing 11, 12, and exhaust conduit 43 is desirably interrupted, during the cleaning of the corresponding bags, a swinging damper 46 is mounted within each valve box 45. As shown, this damper is carried by trunnions, as 46ª, which project through and are journaled in the walls of the valve box 45 near the top of the same (Fig. 7), and the damper swings between a vertical position in which it serves to close the opening to the conduit 43, and an inclined position in which it covers a plurality of openings 48 in the opposite side wall of the valve box. A bell crank lever 49, to one arm of which a weight 50 is attached, is applied to one of the trunnions 47 of the damper 46, and serves to normally retain the damper in the said inclined position.

Since each damper 46 is to be moved to its vertical position for closing the opening to the exhaust conduit 43 only during the cleaning of the corresponding bags 10 and, since it is the intention that but one set of bags will be cleaned at a time, it follows that during the cleaning of the bags air is admitted to the interior of the casing about the bags through the openings 48 in the valve box 45. This air is drawn into the bags 10 and thence into the hopper 14 and conduit 16 where it mingles with the dust laden air entering the filtering bags 10 of another set. The swinging of each valve 46 to closed position is accomplished by a ratchet wheel 51 and this ratchet wheel also serves to move the parts of the mechanism provided for shaking the corresponding filter bags 10 to operative position. As shown, the shorter arm 52 of the bell crank lever 49 carries a pin 53 which enters a slotted opening 54 of a cam lever 55. This cam lever is pivoted upon the side wall of the valve box 45 adjacent the rim of the ratchet wheel 51 and is formed to provide a cam engaging lug 56 which cooperates with a cam block 57, carried by the ratchet wheel. Preferably the cam lug 56 is formed upon the lever 55 adjacent its pivot and is of such shape as to cooperate with the forward face of the cam block 57 to swing the valve 46 to closed position during the movement of the ratchet wheel 51 through a distance corresponding to the length of a single tooth thereof. Thereafter the cam lug 56 rides upon the rim of the cam block 57 and serves to hold the valve 46 in closed position during the turning of the ratchet wheel through a distance equal to the length of the cam block 57. Preferably this latter distance corresponds with the combined length of several teeth upon the ratchet wheel. When the cam lug 56 is released from the cam block 57 by a further turning of the ratchet wheel, the damper 46 is immediately moved to its open position by the weight 50.

During the shaking of the filter bags 10 of each set, the corresponding weighted plunger rod 26 is intermittently lifted by the cooperation of a two-wing cam 58 mounted on the counter shaft 39 with a cam roller 59, (Fig. 7). As shown, the cam roller 59 is carried by a lever 60 which is forked at its inner end. In order that the lever 60 may be moved by the swinging of the cam lever 55, one arm of the forked inner end of the lever 60 is pivotally engaged with the pin 53, already described. The other arm of the forked inner end of the lever 60 is pivotally engaged with a similar pin 61 located at the opposite end of the valve box 45 (Fig. 8). As shown, the pin 61 is mounted in the crank arm 62 applied to the trunnion of the damper 46 remote from the bell crank lever 49. It follows that the swinging of the damper 46 between its open and closed positions is accomplished by a movement of the lever 60 which carries the cam roller 59 into and out of operative position with respect to the wing cam 58.

The forward end of the lever 60 is connected by a link 63 with a lever 64 which is, in turn, connected with the plunger rod 26. A shaft 67 mounted on the valve box 45 provides a common pivotal support for the lever 64, ratchet wheel 51 and a bell crank lever 65. The bell crank lever 65 is provided at the end of one of its arms with a pawl 66 for actuating the ratchet wheel 51, while the other arm of the bell crank lever 65 is formed with a yoke 68 which cooperated with a cam 69, carried by the counter shaft 39, for swinging the said bell crank lever.

While the counter shaft 39 serves to actuate the ratchet wheels 51, associated with both of the valve boxes 45, the cam blocks 57 will preferably be so positioned upon the two ratchet wheels as to be engaged with the corresponding cam levers 55 at different times. Since the engagement of each cam block 57 with the corresponding cam lever 55 occurs only during a small part of each complete revolution of the ratchet wheel 51, the arrangement is capable of use when a large number of sets of filter bags are employed, without its being necessary to clean more than one set of bags at a time. On the other hand, should it be desirable to clean the bags of any set at shorter intervals than the complete rotation of the ratchet wheel 51, this ratchet wheel may be equipped with a plurality of cam blocks 57. In the drawings the ratchet wheel 51 is shown as being supplied with a plurality of sets of openings 70 for the application of additional cam blocks thereto.

While the engagement of the wing cam 58 with the cam roller 59 tends to move the roller forwardly out of the path of the cam, this movement is prevented by the engagement of the lever 56 with the rim of the cam block 57. The cooperation of the wing cam 58 with the roller 59 accordingly serves to repeatedly lift the weighted plunger 26 and permit it to fall throughout the period of engagement of the cam block 57 with the lever 55. Likewise, this same engagement of the cam block with the lever 55 serves to hold the damper 46 in closed position. The cleaning of the filter bags 10 is accordingly accomplished by a repeated slackening and jerking of the bags from their upper ends and a reversal of the air currents through the bags.

I claim as my invention:

1. An air filter comprising, in combination, a casing having an inlet opening in one end thereof and a discharge opening, a flexible tubular filter bag normally under tension arranged within the chamber of the casing, and having one end secured to said casing about said inlet opening, the opposite end of said bag being closed, and means including toggle mechanism attached to the free end of said bag for giving the bag a sharp upward jerk for cleaning the same.

2. An air filter comprising, in combination, an upright casing having an inlet opening in the bottom thereof and a discharge opening, a flexible tubular filter bag vertically arranged within the chamber of the casing and having its lower end fixedly attached to the bottom of the casing about the said inlet opening, the upper end of the bag being closed, a tubular upright bolt attached to the upper end of the filter bag and sliding through the cover of the casing, a weighted spindle sliding in the bolt and a toggle frame connecting the bolt and spindle, the elbow of the toggle frame being held against vertical movement.

3. An air filter comprising, in combination, an upright casing having an inlet opening in the bottom thereof and a discharge opening, a flexible tubular filter bag vertically arranged within the chamber of the casing and having its lower end fixedly attached to the bottom of the casing about the said inlet opening, the upper end of the bag being closed, a tubular upright bolt attached to the upper end of the filter bag and sliding through the cover of the casing, a weighted spindle sliding in the bolt, a toggle frame connecting the bolt and spindle, the elbow of the toggle frame being held against vertical movement, and means acting to alternately raise and release the spindle.

4. A bag shaking device for air filters, comprising a tubular upright bolt attached to the upper end of a bag, a weighted spindle sliding within the bolt, a toggle frame connecting the bolt and spindle, and means for alternately raising and releasing the spindle.

5. An air filter comprising a flexible filter bag suspended from a yoke, a casing enclosing said bag, a rod adjustably connected to said yoke, means for periodically reciprocating said yoke for checking said bag, means extending to the exterior of said casing for adjusting the tension of said bag, and means for indicating the lack of proper tension of said bag.

6. An air filter comprising a plurality of flexible filter bags suspended from a yoke, a casing enclosing the yoke and filter bags, a bolt extending through the casing and threadedly engaging the yoke, and supporting means for said bolt located outside the casing, a rod for operating said bolt, means for elevating said rod to slacken said bags, and means for giving said bags a sharp jerk for cleaning the same.

7. An air filter comprising, in combination, a plurality of filter bags, a casing enclosing all the bags, a suspension device for said bags located within the casing, a tubular upright bolt threadedly engaging said suspension means and sliding through the cover of the casing, a weighted spindle sliding in the bolt, a toggle frame connecting the bolt and spindle, the elbow of the toggle frame being held against vertical movement and means for alternately raising and releasing the spindle.

8. An air filter comprising, in combination, an upright casing comprising top, side and bottom walls, a flexible tubular filter bag vertically arranged within the casing normally under tension and fixedly attached at its lower end to the wall of the casing, yielding means within said casing for periodically checking said bag, mechanism for operating said yielding means, and means extending to the exterior of said walls for adjusting the tension of said bag.

9. An air filter comprising, in combination, a filter bag, a casing therefor, suspending means attached to the upper end of said bag, means including a member engaging said suspending means for alternately raising and releasing the same, means exteriorly of said casing for adjusting one of said means relatively to the other during the operation of the filter and means for audibly indicating the lack of tension of said bags.

WILLIAM B. PROUTY.